Oct. 4, 1966    N. L. STAUFFER    3,277,494
OSCILLOGRAPH WITH FILTER MEANS
Filed April 1, 1964    6 Sheets-Sheet 1

INVENTOR.
NORMAN L. STAUFFER
BY
ATTORNEY.

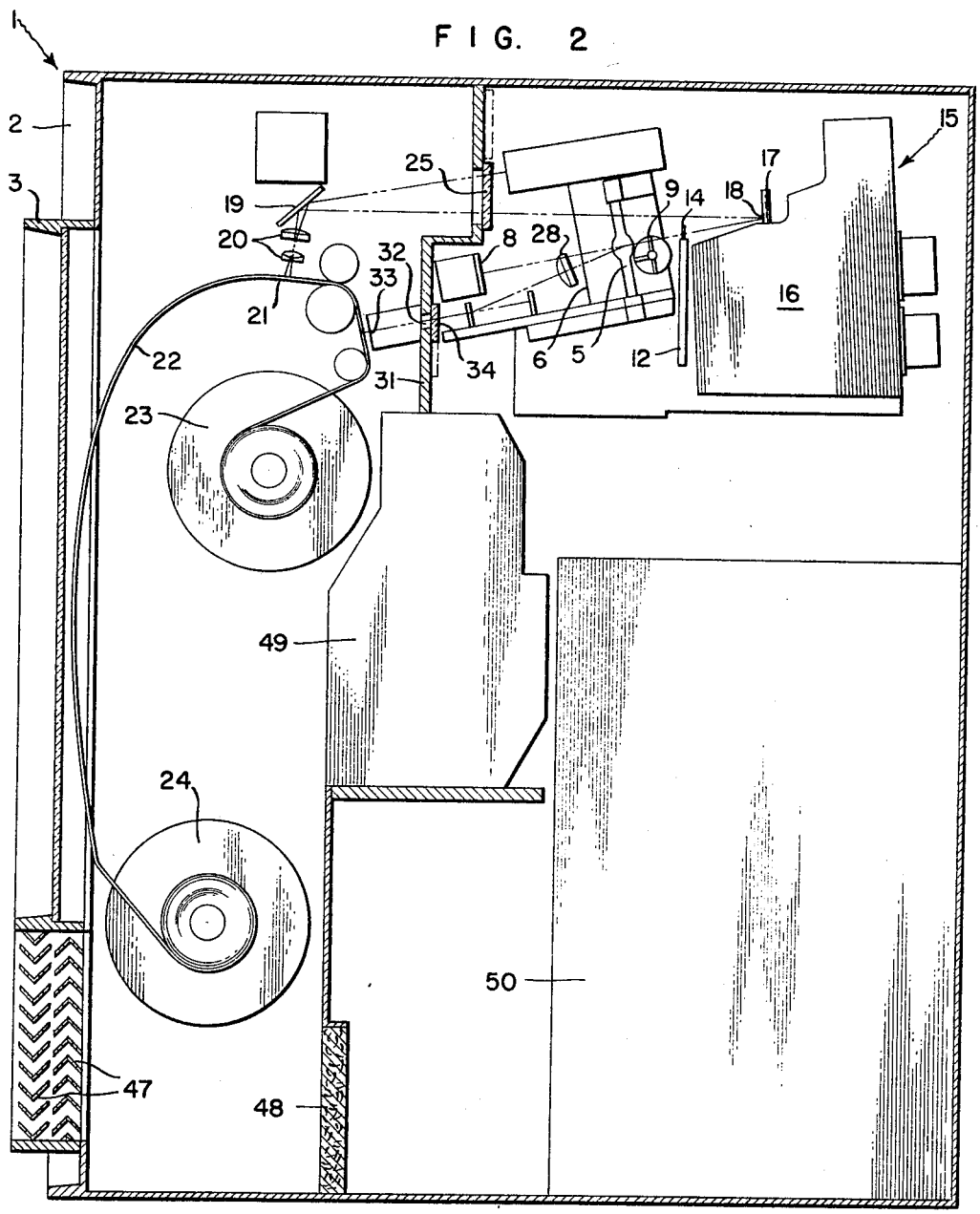

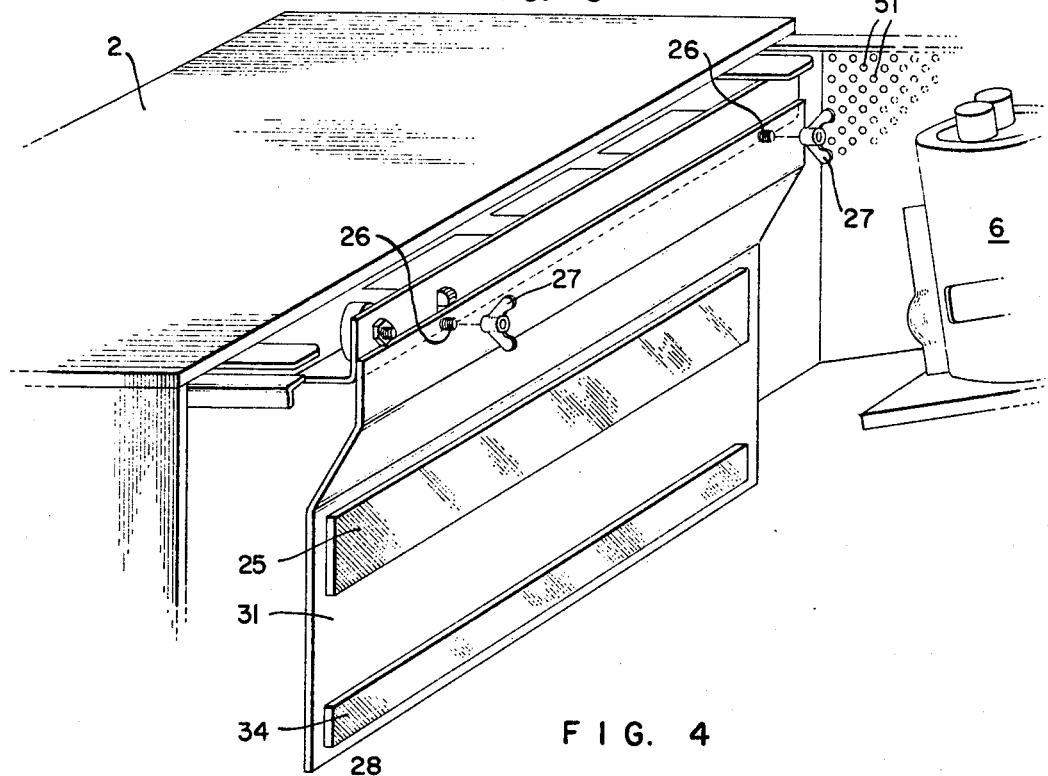
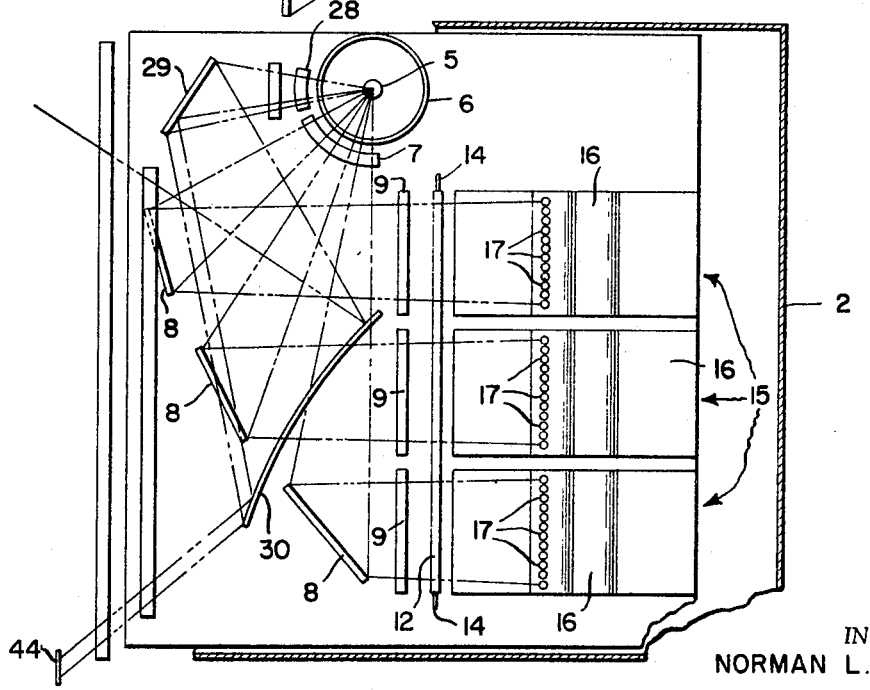

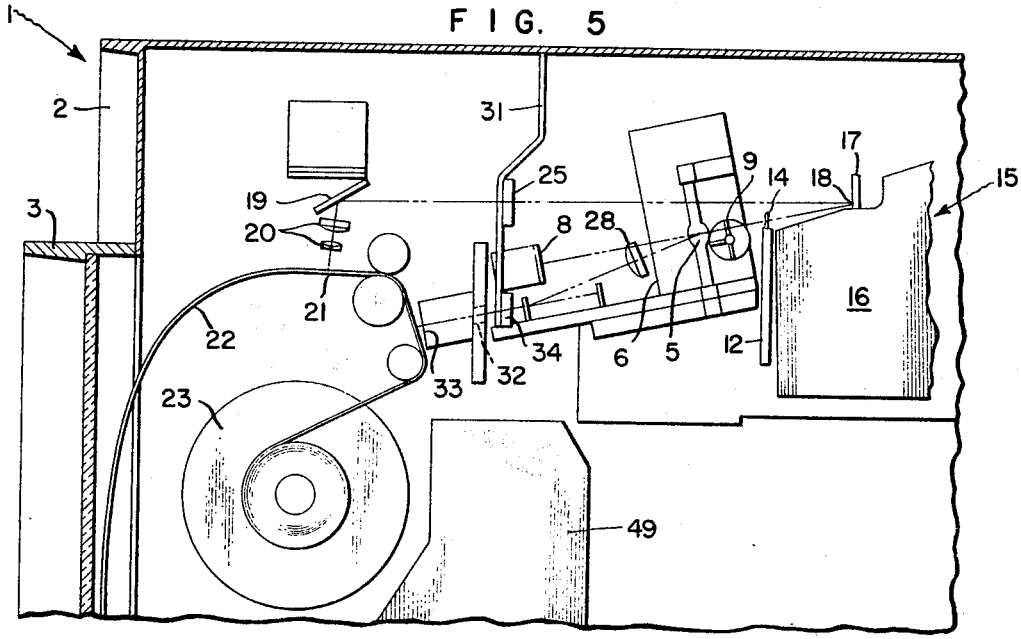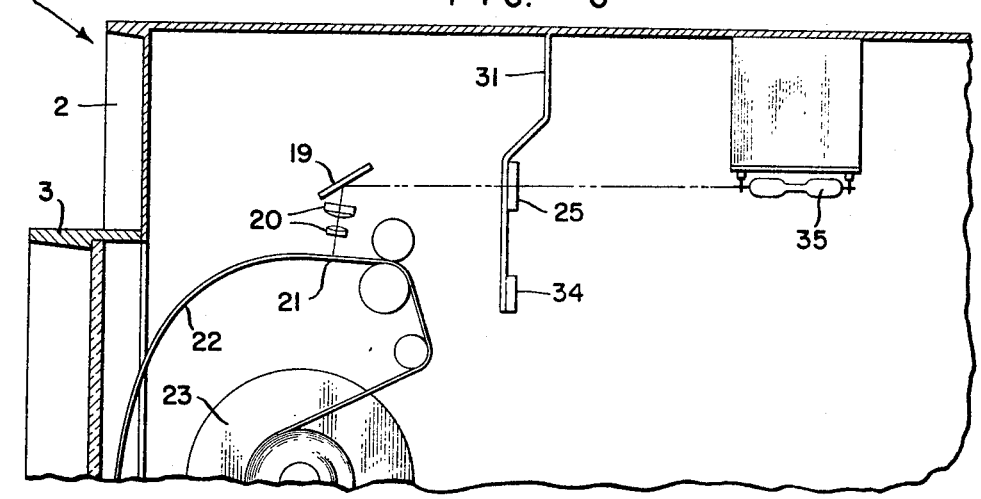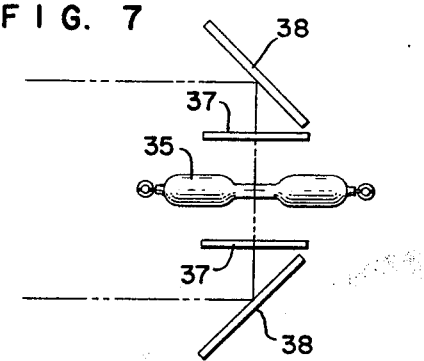

Oct. 4, 1966

N. L. STAUFFER 3,277,494

OSCILLOGRAPH WITH FILTER MEANS

Filed April 1, 1964

INVENTOR.
NORMAN L. STAUFFER

ATTORNEY

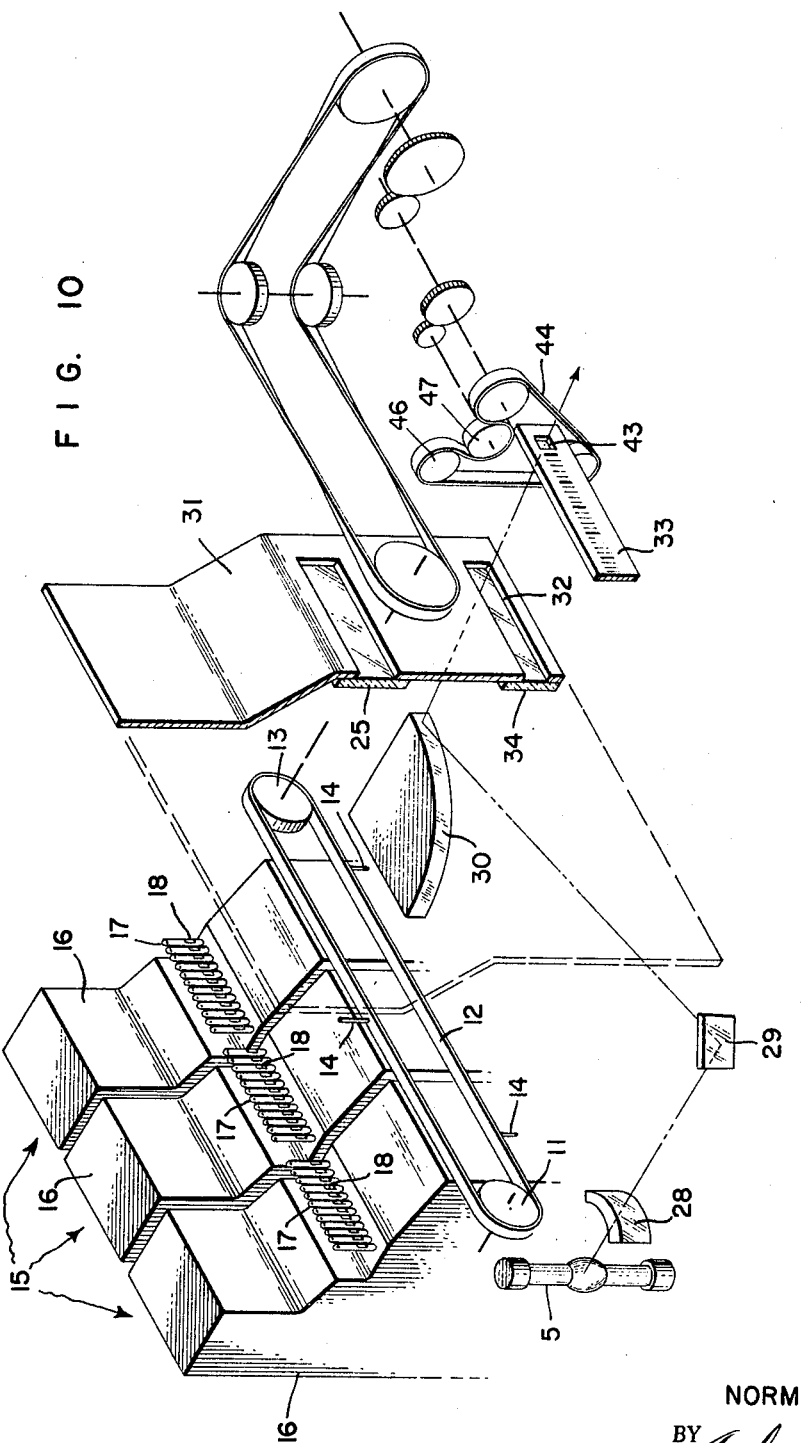

3,277,494
OSCILLOGRAPH WITH FILTER MEANS
Norman L. Stauffer, Englewood, Colo., assignor to Honeywell Inc., a corporation of Delaware
Filed Apr. 1, 1964, Ser. No. 356,541
8 Claims. (Cl. 346—108)

This invention relates to improvements in recording oscillographs such as those shown in the following United States patents: 2,580,427, patented January 1, 1952, to C. A. Heiland; 3,066,299, patented November 27, 1962, to R. S. Kampf.

Recorders like these operate on relatively insensitive, direct-writing (print-out) papers. Since such papers are not exceedingly sensitive to radiant energy such as light, great care is not required with the direct-writing papers in terms of the control of overall light level within the recorder.

It is an object of this invention to permit recording oscillographs of this type to be used with sensitive, high-contrast, develop-out papers. Such papers come in a wide range of sensitivities. This is a great advantage secured by this invention in that a wide range of recording paper may be used. This range extends from cheap, insensitive paper to expensive, highly sensitive paper.

An object of this invention is to prevent substantially all or a large fraction of the radiant energy from falling on the exposed record as it travels across the platen surface or recording plane and is re-spooled on the take-up roll or spool in the lower part of the recorder. The light level within the recorder is controlled to prevent fogging of the general background of the paper so that specific data may be recorded sharply and clearly and is not made difficult to read by halation or fogging.

More specifically, it is an object of this invention to exclude radiant energy, such as light, from the recording plane of the recorder by means of a light shield door or front screen which is opaque or which filters out a large part of the radiant energy which would otherwise reach the actual recording plane or area.

A still further object of this invention is to provide filters between the optics chamber of the recorder and the actual recording plane or area.

An additional object of this invention is to provide that the door and the filters be readily attachable and detachable so that they can be used or not or changed, as desired.

Still another object of this invention is to provide a filter of neutral density (which attenuates all wave lengths to which the recording medium is responsive nearly equally) or to provide filters having different spectral characteristics (filters which attenuate various parts of the light passing through them at different intensities).

A better understanding of the present invention may be had from the following detailed description when read in connection with the accompanying drawings, in which:

FIG. 2 is a diagrammatic or schematic view in vertical cross section showing the relative locations of the parts of the oscillograph of this invention.

FIG. 3 is a perspective view of the front wall of the optics chamber and of the lamp housing.

FIG. 4 is a diagrammatic or schematic view from the top showing the paths taken by the various beams of radiant energy.

FIG. 5 is a diagrammatic or schematic view in side elevation showing the paths taken by the various beams of radiant energy.

FIG. 6 is a diagrammatic or schematic view in side elevation showing the paths taken by the beams used to form the time lines.

FIG. 7 is a diagrammatic or schematic view in plan showing the source of radiant energy for the time lines as shown in FIG. 5.

FIG. 10 is a perspective view showing the trace numbering device.

Figure 1:
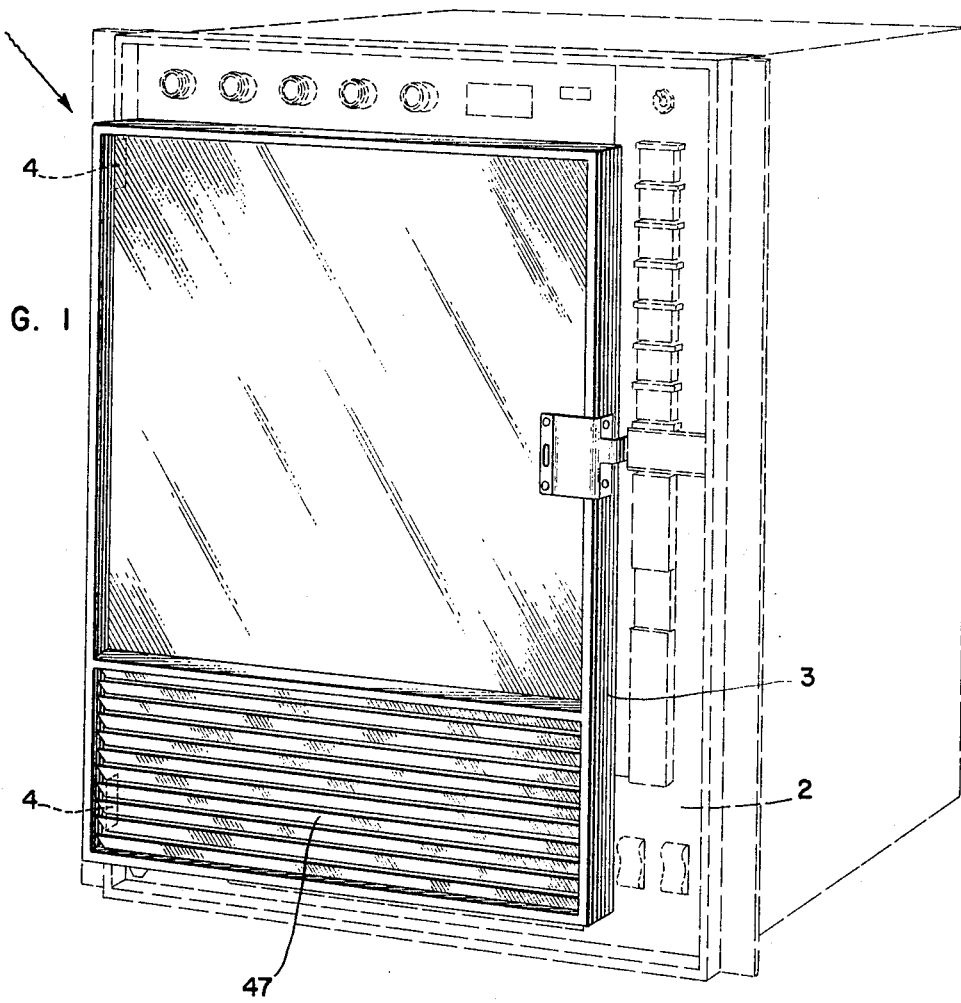
FIG. 1 is a perspective view of the front and side of the oscillograph of this invention.

FIG. 1 shows that the oscillographic recorder of this invention comprises a case 1 of opaque, sheet metal or the like having a panel 2 having an opening therein. The door 3 is mounted on the case 1 by mounting means 4, such as hinges, whereby it may be readily attached to or detached from the case 1. The door 3 may be an opaque light shield for the purpose of excluding substantially all ambient light from entering the case through the opening therein or the door 3 may be a deep red filter and not be completely opaque. Such a filter will operate successfully with some develop-out recording materials.

FIG. 2 shows that the interior of case 1 is divided into a front or recording chamber and a rear or optics chamber. This division is done by a first filter 25 which filters the recording rays and the time line rays) and by a second filter 34 (which filters the grid lines and the trace numbers). Filters 25 and 34 are mounted on an opaque wall 31. This wall contains a light and dust filter 48 which permits a flow of air but excludes the passage of light to the recording or record chamber. The front wall of case 1 contains a light baffle 47 which permits the passage of air but excludes the passage of light to the recording chamber.

FIG. 3 shows the optics chamber which is located in the upper, rear part of case 1. A source of radiant energy 5 (FIG. 4) is located in the optics chamber within the lamp housing 6. Filters 25 and 34 may be mounted in case 1 by screws 26 and wing nuts 27. Filters 25 and 34 can, therefore, be readily placed into or removed from case 1 and substitute filters provided therefor, if desired.

The optics chamber is not completely sealed and some ambient light may enter through the cooling vents 51. However, any light which enters or originates in the optics chamber must pass through one of the filters before reaching the recording medium in the recording chamber.

As is seen in FIG. 2, a beam of light from lamp 5 passes to the individual galvanometer mirrors 18 in three magnet banks or blocks 16. The galvanometers (hereinafter sometimes abbreviated galvo) are indicated generally at 15 and each comprises a bank 16 of magnetic material having one or more holes in it. A pencil galvanometer 17 having a movable mirror 18 in it may be inserted into each of the holes in the bank 16. The radiant energy or galvobeam from the individual galvanometer mirrors 18 shines through the first filter 25, which is located between the optics chamber and the record plane, so that, in addition to controlling the intensity of the radiant energy from the galvanometer mirrors, the filter 25 keeps the light in the optics chamber from reaching the record plane 21. Such light may be ambient or produced by the source of light 5.

FIG. 2 also shows another beam of light from lamp 5. This beam passes through aperture 32 in the cross brace 31 and through the second filter 34 and through the grid strip 33 by means of which the grid lines are applied to the record medium 22.

A power supply 50 is located in the optics chamber of the case 1 and supplies electricity to lamp 5 and to the other sources of radiant energy and to the electric motor of the transmission 49 by means of which the record medium 22 is moved.

FIG. 2 shows that the case 1 contains a recording region or chamber from which radiant energy, such as light, is excluded, except as desired, by the filters 25 and 34. These filters permit desired beams of radiant energy to pass through them to the record medium 22 which comprises a strip chart of suitable develop-out paper having any one of a wide range of sensitivities. This record medium 22 is mounted on a supply roll 23 and is trained over suitable guide rolls past a record plane 21 to the take-up roll 24. The transmission 49 contains an electric motor suitably connected to drive the record medium 22 from supply roll 23 to take-up roll 24 or in the reverse direction.

FIGS. 4 and 5 show the paths of the beams of radiant energy which form the record or trace which the oscillograph produces. Source 5 comprises a high intensity, mercury-vapor, light source or electric lamp having a large proportion of its output in the ultra-violet range. Source 5 is mounted in a lamp housing 6 which emits three beams of radiant energy which are concentrated by collector lens 7 onto three light control mirrors 8 through the light intensity control 9, which is manually or automatically operable. The galvanometer mirrors, therefore, have an apparent light source at dead-ahead position. This avoids any parallax error and resultant non-linearity.

Control 9 comprises: two filters, each of a different attenuation; one opaque shutter, which prevents the beam of radiant energy from falling on the record medium 22; and one blank space, which permits the beams of light to pass uninterrupted. These beams pass through the record or trace identifier 12 to the individual galvanometer mirrors 18 in three magnet banks or blocks 16. The galvanometers are indicated generally 15 and comprise a bank 16 of magnetic material having one or more holes in it. A pencil galvanometer 17 having a movable mirror 18 in it may be inserted into each of the holes in the bank 16.

The radiant energy from the individual galvanometer mirrors 18 shines through the first filter 25, which is located between the optics chamber and the record plane 21, so that, in addition to controlling the intensity of the radiant energy from the galvanometer mirrors, the filter 25 also keeps the light in the optics chamber from reaching the record plane 21. Such light may be ambient or produced by the source of light.

Radiant energy from the galvanometer mirrors, being of greater intensity, continues through the filter 25 at the proper level and is reflected onto the record medium 22 by the record mirror 19 and is concentrated in a sharp spot of light by the double lens arrangement 20 onto the record plane 21. The record medium 22 comprises a strip chart of suitable develop-out paper having any one of a wide range of sensitivities.

Means are provided for placing on the record medium accurately spaced, longitudinal, reference lines or grid lines. FIGS. 4 and 5 show that these means comprise the source 5 from whence a beam of radiant energy passes through a grid lin lens 28 to the first grid line mirror 29 and the second grid line mirror 30 which reflects the radiant energy through an aperture 32 in the cross brace 31 through the grid strip 33 by means of which the grid lines are applied to the record medium 22.

Means are also provided for making time lines across the width of the record medium 22 at various interval rates of time selected by the operator, or, if desired, driven from an external source.

FIGS. 6 and 7 show that these means comprise a source of radiant energy for the time lines comprising a Xenon lamp 35 which has different spectral characteristics as well as being of somewhat different intensity from the source 5 for the galvanometer beams. Radiant energy from source 35 passes through time line lenses 37 and is reflected by time line mirrors 38 through filter 25 to record mirror 19 and record lenses 20 to the record medium 22 at the record plane 21.

FIG. 10 shows means for identifying the various traces which form parts of the records which are produced on the record medium 22. These means 10 comprise a pulley 11 on which is trained a belt 12 which passes over a second pulley 13 and which bears one or more arms or rods 14 on it. Belt 12 is adapted to be driven by means (not shown) so that the rod or rods interrupt each of the beams of light passing to the galvanometer mirrors 18 and thereby produce an interruption in the traces made by the beam of light on the record medium 22.

Figure 9:
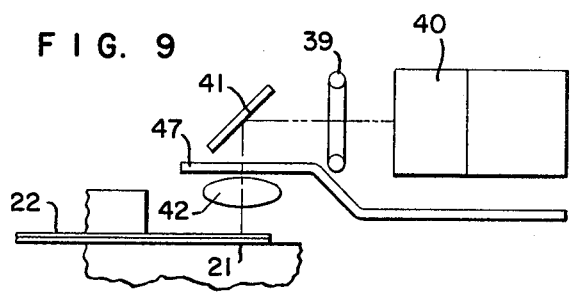
FIG. 9 is a diagrammatic or schematic view in vertical, cross section at right angles to FIG. 7 and showing the record numbering device.

FIG. 9 shows one means for numbering the record on the record medium 22. These means comprise a source of radiant energy for the counter or record numbering device comprising a flash tube 39 which is flashed (by means not shown) at the beginning of each record, or, if desired, upon command of the operator through remote control circuitry of the oscillograph. Radiant energy is reflected through the counter aperture 40 onto the record number mirror 41 and is focused on the record plane 21 by the lens 42. At the instant the record number is flashed, the entire counter housing area is strongly illuminated. In order to prevent this light from affecting the sensitive develop-out papers, a flexible filter 47 reduces the amount of light to that necessary to record the record numbers only after reflection from the counter surface. This filter is readily installed or removed by removing the counter itself and slipping the filter out or in as required. The counter itself is removed very simply by turning the latch handle on the side of the instrument to release the counter for withdrawal.

Figure 8:
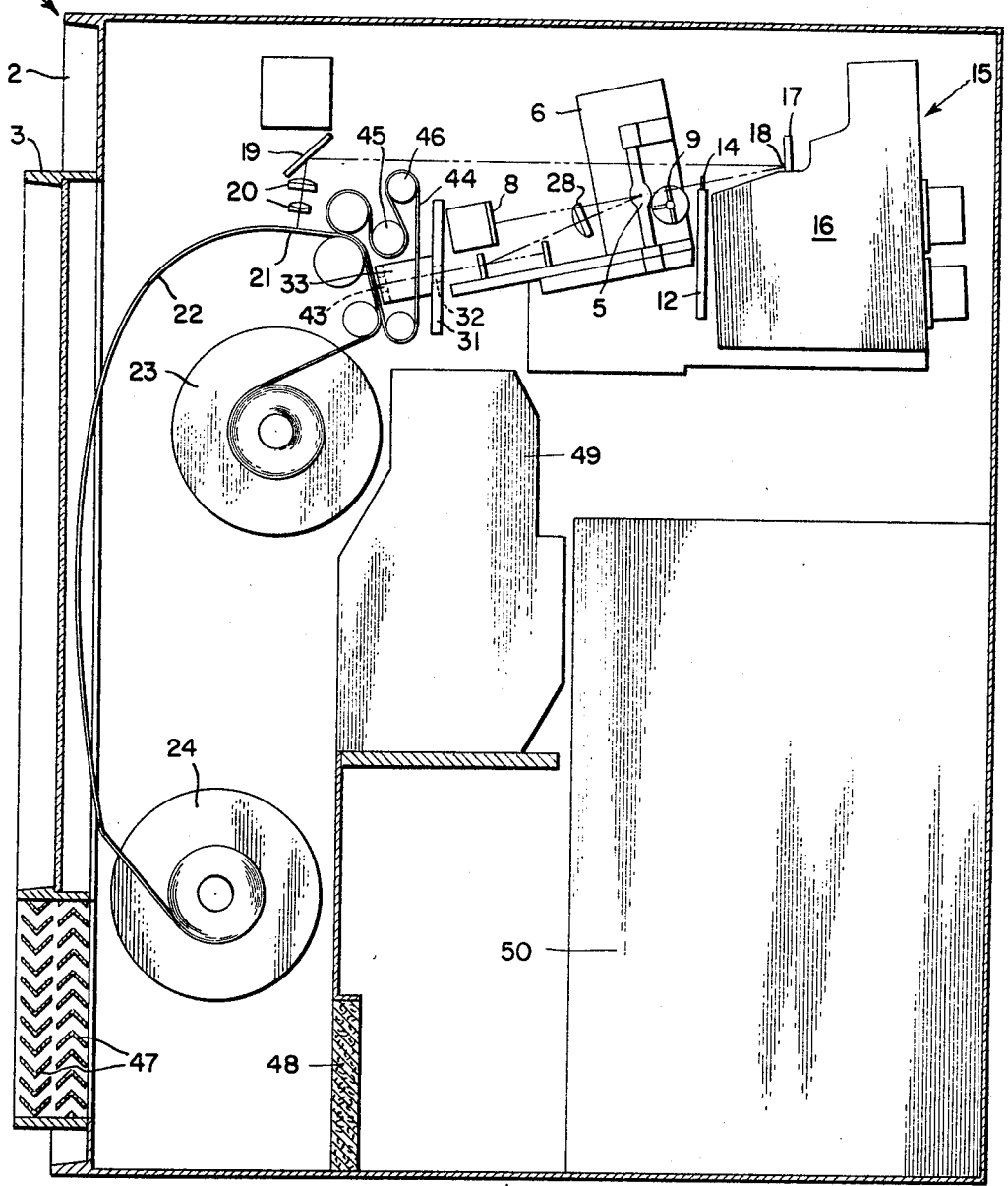
FIG. 8 is a diagrammatic or schematic view in side elevation showing the paths taken by the beams of radiant energy which record the indications of the trace numbering device.

FIGS. 4, 8, and 10 show means for numbering traces on the record medium 22. These means comprise source 5 which transmits a narrow beam of radiant energy through grid lines lens 28. The narrow beam is reflected by a first guide line mirror 29 and by the second grid line mirror 30, thence the beam passes through aperture 32 in cross brace 31, through aperture 43 in grid strip 33 and is focused on one of the numbers appearing on a film 44 whence it passes to an appropriate position alongside one of the records or traces on the record medium 22.

The film 44 is mounted on a plurality of adjustable guide rollers 46 and is driven by a drive sprocket 45 through suitable means (not shown). This beam passes through the grid line filter 34 before it reaches the record medium 22.

What is claimed is:
1. A recording oscillograph including
   a case,
   wall means within said case forming therein a recording chamber,
   a radiation-sensitive record medium located within said chamber,
   a source of radiation located within said case exteriorly of said chamber,
   opening means opening into said chamber to permit at least controlled radiation from said source to enter said chamber,
   filter means located with respect to said opening means to cause all radiation passing into said chamber to pass through said filter means,
   and means to permit the ready removal of at least a portion of said filter means from said opening means.

2. An oscillograph as specified in claim 1, wherein
   said opening means includes an opening in said wall means through which said controlled radiation from said source passes to said record medium, and wherein said filter means includes a filter which effectively closes said opening.

3. An oscillograph as specified in claim 1, wherein said opening means includes an opening in said case through which radiation from outside of said case can pass into said recording chamber, and wherein said filter means includes a filter which effectively closes said opening.

4. An oscillograph as specified in claim 1, wherein said opening means includes a first opening in said wall means through which said controlled radiation from said source passes to said record medium, and includes at least one opening in said case through which radiation from outside of said case passes into said case and through said first opening into said chamber, and wherein said filter means includes a filter which effectively closes said first opening.

5. A recording oscillograph including a substantially opaque case, an opaque wall located within said case and dividing the latter into a recording chamber and an optics chamber, a radiation-sensitive record medium located within said recording chamber, a source of radiation located within said optics chamber, opening means located within said wall and constituting the sole means for the passage of radiation between said chambers, optical means located within said optics chamber and directing radiation from said source through said opening means to said record medium to produce recorded images thereon, an opening in said case from the exterior thereof to said recording chamber to expose said record medium therein to radiation existing outside of said case, filter means for attenuating radiation of the type to which said record medium is particularly sensitive, and mounting means releasably mounting said filter means in said opening means and in said opening, to cause all radiation passing into said recording chamber to pass through said filter means, when said record medium is one having a relatively high sensitivity to said radiation existing outside of said case, said mounting means permitting the ready removal of said filter means from said opening means and said opening when said record medium is one having a relatively low sensitivity to said radiation existing outside of said case.

6. A recording oscillograph including a substantially opaque case, an opaque wall located within said case and dividing the latter into a recording chamber and an optics chamber, a radiation-sensitive record medium located within said recording chamber, a source of radiation located within said optics chamber, filter means located within said wall and constituting the sole means for the passage of radiation between said chambers, optical means located within said optics chamber and directing radiation from said source through said filter means to said record medium to produce recorded images thereon, an opening in said case from the exterior thereof to said recording chamber to expose said record medium therein to radiation existing outside of said case, a door mounted in cooperative relationship with said opening, shield means mounted within said door to prevent the passage from outside of said case to said record medium of radiation to which said record medium is particularly sensitive, and means to permit the ready removal of said filter means and said shield means upon the use in said recording chamber of a record medium which is substantially unaffected by radiation existing outside of said case.

7. An oscillograph as specified in claim 6, wherein said shield means is opaque.

8. An oscillograph as specified in claim 6, wherein said shield means is a filter to permit the viewing of said record medium from outside of said case.

References Cited by the Examiner

UNITED STATES PATENTS

| | | | |
|---|---|---|---|
| 2,580,427 | 1/1952 | Heiland | 346—108 |
| 3,064,260 | 11/1962 | Heiland | 346—109 |
| 3,066,299 | 11/1962 | Kampf | 346—109 |
| 3,123,711 | 4/1964 | Fajans | 250—83.3 X |
| 3,186,000 | 5/1965 | Sihvonen et al. | 346—109 |

RICHARD B. WILKINSON, *Primary Examiner.*

LEO SMILOW, *Examiner.*

JOSEPH W. HARTARY, *Assistant Examiner.*